(12) United States Patent
Ebert

(10) Patent No.: US 11,897,040 B2
(45) Date of Patent: Feb. 13, 2024

(54) AXLE BORING MACHINE, MOUNTING ASSEMBLIES AND AXLE REPAIR METHODS

(71) Applicant: James L. Ebert, Huron, OH (US)

(72) Inventor: James L. Ebert, Huron, OH (US)

(73) Assignee: James L. Ebert, Huron, OH (US)

( * ) Notice: Subject to any disclaimer, the term of this patent is extended or adjusted under 35 U.S.C. 154(b) by 400 days.

(21) Appl. No.: 16/908,040

(22) Filed: Jun. 22, 2020

(65) Prior Publication Data

US 2020/0316690 A1    Oct. 8, 2020

Related U.S. Application Data

(62) Division of application No. 14/153,507, filed on Jan. 13, 2014, now Pat. No. 10,717,132.

(51) Int. Cl.
| | |
|---|---|
| *B23B 5/04* | (2006.01) |
| *B23P 6/00* | (2006.01) |
| *B23B 41/00* | (2006.01) |
| *B23B 29/02* | (2006.01) |
| *B60B 35/14* | (2006.01) |

(52) U.S. Cl.
CPC ............... *B23B 5/04* (2013.01); *B23B 29/02* (2013.01); *B23B 29/027* (2013.01); *B23B 41/00* (2013.01); *B60B 35/14* (2013.01); *B23B 2260/0045* (2013.01); *B23P 6/00* (2013.01); *Y10T 29/49726* (2015.01); *Y10T 29/53004* (2015.01)

(58) Field of Classification Search
CPC ......... B23B 5/04; B23B 29/02; B23B 29/027; B23B 2260/0045; Y10T 29/49726; Y10T 29/53652; Y10T 29/53917; Y10T 29/53983; Y10T 29/53978
USPC ....... 29/402.01, 402.09, 402.11, 402.21, 447
See application file for complete search history.

(56) References Cited

U.S. PATENT DOCUMENTS

| | | | | |
|---|---|---|---|---|
| 940,805 | A | * | 11/1909 | Hansen .................... B21K 9/00 29/402.21 |
| 2,924,128 | A | | 2/1960 | Lucker |
| 3,252,192 | A | * | 5/1966 | Smith ....................... F16L 1/10 138/99 |
| 3,711,920 | A | | 1/1973 | Simmons |
| 4,455,732 | A | * | 6/1984 | Shiets .................... B22D 19/10 29/402.06 |
| 4,820,089 | A | | 4/1989 | Shiets |
| 5,966,812 | A | * | 10/1999 | Shiets ....................... B23P 6/00 29/402.21 |

(Continued)

*Primary Examiner* — Sarang Afzali
*Assistant Examiner* — Darrell C Ford
(74) *Attorney, Agent, or Firm* — Vivacqua Crane PLLC

(57) ABSTRACT

An axle boring assembly includes a portable power head or drive unit, a bearing pack to which the drive unit is attached, an adjusting base to which the bearing pack is adjustably secured and a mounting assembly which fits over a motor vehicle axle and to which the adjusting base is secured. The mounting assembly comprises a first section having axially spaced apart front and rear clamps and a substantially identical second section with matching spaced apart front and rear clamps. Threaded fasteners extend between the front and rear clamps and may be rotated to secure the mounting assembly about the end of the axle. Each clamp includes jaws which contact the axle and which may be selected from sets of various sizes and configurations to ensure accurate and suitable engagement of the axle.

7 Claims, 13 Drawing Sheets

(56) References Cited

U.S. PATENT DOCUMENTS 7,066,690 B2 6/2006 Ebert
2006/0156531 A1 7/2006 Dwileski

\* cited by examiner

AXLE BORING MACHINE, MOUNTING ASSEMBLIES AND AXLE REPAIR METHODS

FIELD

The present disclosure relates to machines and methods for boring axles and more particularly to a boring machine, mounting assembly and method suitable for repairing a damaged semi-tractor or trailer axle.

BACKGROUND

The statements in this section merely provide background information related to the present disclosure and may or may not constitute prior art.

Commercial vehicles, particularly long haul trucks and trailers, can readily travel one hundred thousand miles a year or more. Spindle bearing journal wear accumulates constantly during such use and can be monitored, detected and corrected during routine maintenance. When such wear exceeds a certain amount, it is desirable to replace some or all of the spindles in, for example, a repair facility before they fail on the highway. Motor vehicle axle and bearing components in such commercial vehicles can fail in spite of routine preventative maintenance. Such failures typically occur when the vehicle is in service and thus miles distant from a service facility and many miles from its base of operation. Not only may the replacement of an axle consume several days during which the vehicle is out of operation, but it generally must also be towed to a service facility to undertake the repairs. Due to the expense, both of the actual repair and the lost income accompanying the down time of the vehicle, in addition to spindle and bearing replacement in a shop or maintenance facility, an industry directed to on-site repair of such failed vehicle axle components has also developed.

My U.S. Pat. No. 6,024,418 illustrates a current approach to axle repair. In this method of repair, a long spindle having both inner and outer bearing surfaces and threads is utilized with a sleeve or liner. After the damaged end of the axle of either a tractor or trailer has been removed, the spindle and liner are installed in the axle and welded to the axle at locations inboard from the end of the axle, away from regions of high stress.

Different axle configurations and sizes, however, necessitate different repair equipment and methods and the present invention addresses repair of a new and different axle configuration.

SUMMARY

The present invention provides a portable boring machine, mounting assembly and methods suitable for repairing a damaged semi-tractor or trailer axle. The boring machine includes a power head or drive unit, a bearing pack which rotatably supports a boring bar and to which the drive unit is attached, an adjusting base to which the bearing pack is adjustably secured and a mounting assembly which fits securely over the axle and to which the adjusting base is secured. The mounting assembly comprises a first or upper portion having axially spaced apart front and rear clamps and a substantially identical second or lower portion with matching spaced apart front and rear clamps. Threaded fasteners extend between the front and rear clamps and may be rotated to tighten and secure the mounting assembly about the end of the axle. Each portion (upper and lower, front and rear) includes two removable and securable jaws or teeth which contact the axle and which may be selected from sets of various sizes and configurations to ensure accurate and suitable engagement of the axle when the threaded fasteners are tightened.

An additional embodiment of the mounting assembly which seats on a machined outer surface of an axle is also disclosed.

The axle repair method comprehends the steps of: removing, preferably by sawing, the damaged end of the axle including the bearing and oil seal surfaces, securing the mounting assembly about the end of the axle, attaching the adjusting base to the mounting assembly, attaching the bearing pack to the adjusting base, installing a shaft in the bearing pack and placing a dial indicator on the shaft into the open end of the axle, adjusting the horizontal and vertical position of the bearing pack (and shaft) to minimize runout, removing the shaft and installing a boring bar and the drive unit on the bearing pack and boring the axle to a size which will accept a spindle, a seal ring and a liner. All of the equipment is then removed from the axle, the spindle, seal ring and liner installed and welds and one or more plug welds are emplaced between the spindle components and the axle according to one of three repair procedures.

It is thus an aspect of the present invention to provide a mounting assembly for securing an adjusting base, a bearing pack and a drive unit to an axle for boring the axle.

It is a further aspect of the present invention to provide a mounting assembly for portable axle repair equipment having a first portion including axially spaced apart front and rear clamps and a second portion including matching spaced apart front and rear clamps.

It is a still further aspect of the present invention to provide a mounting assembly for portable axle boring equipment having a first or upper portion including axially spaced apart front and rear clamps and a substantially identical second or lower portion including matching spaced apart front and rear clamps.

It is a still further aspect of the present invention to provide a method of repairing a tractor or trailer axle utilizing a mounting assembly having a first portion including front and rear clamps and a second portion including front and rear clamps.

It is a still further aspect of the present invention to provide a method of repairing a tractor or trailer axle utilizing a mounting assembly having a first portion including front and rear clamps and a second portion including front and rear clamps, an adjusting base, a bearing pack and a drive unit which supports and rotates a boring bar.

It is a still further aspect of the present invention to provide three repair methods which utilize various combinations of a spindle, seal ring and liner with interference fits and circumferential welds and one or more plug welds to secure a replacement spindle in a motor vehicle axle.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 13:
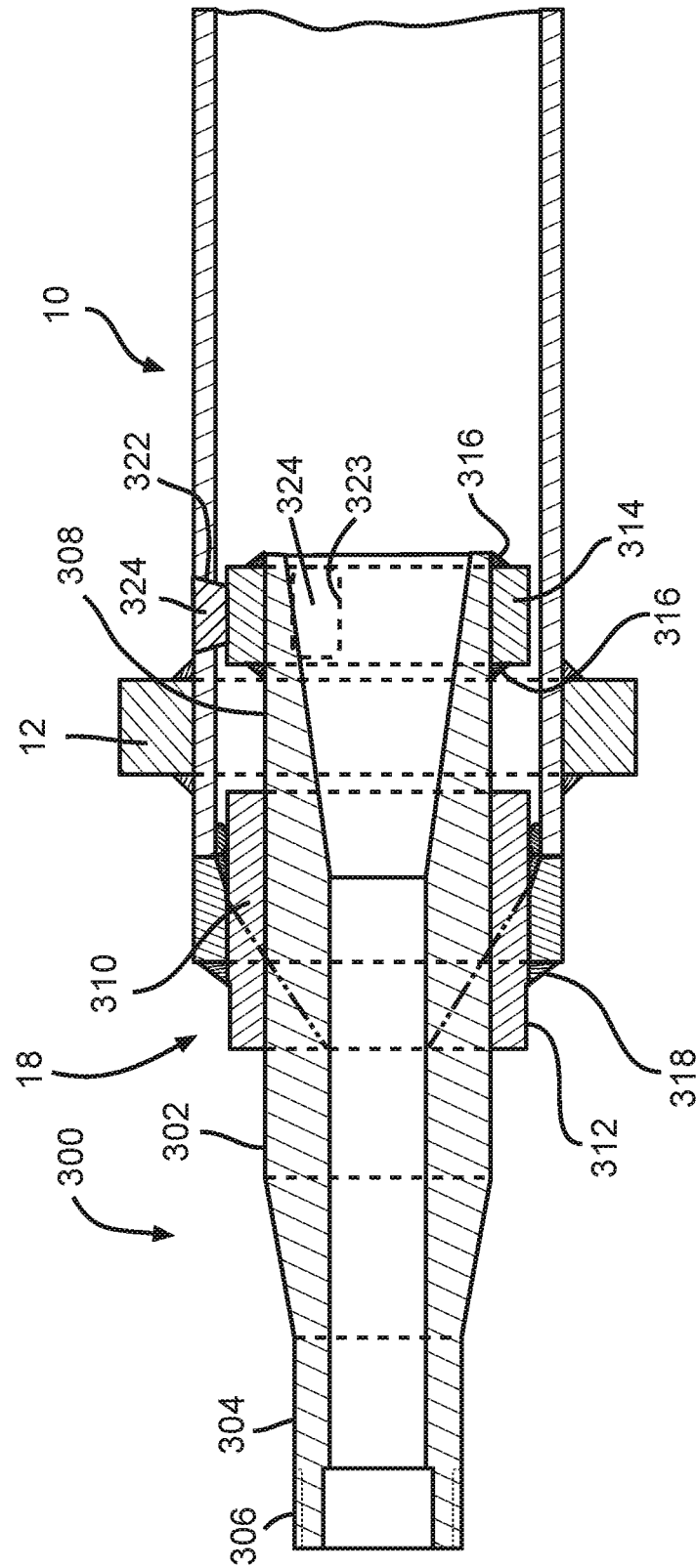
Figure 14:
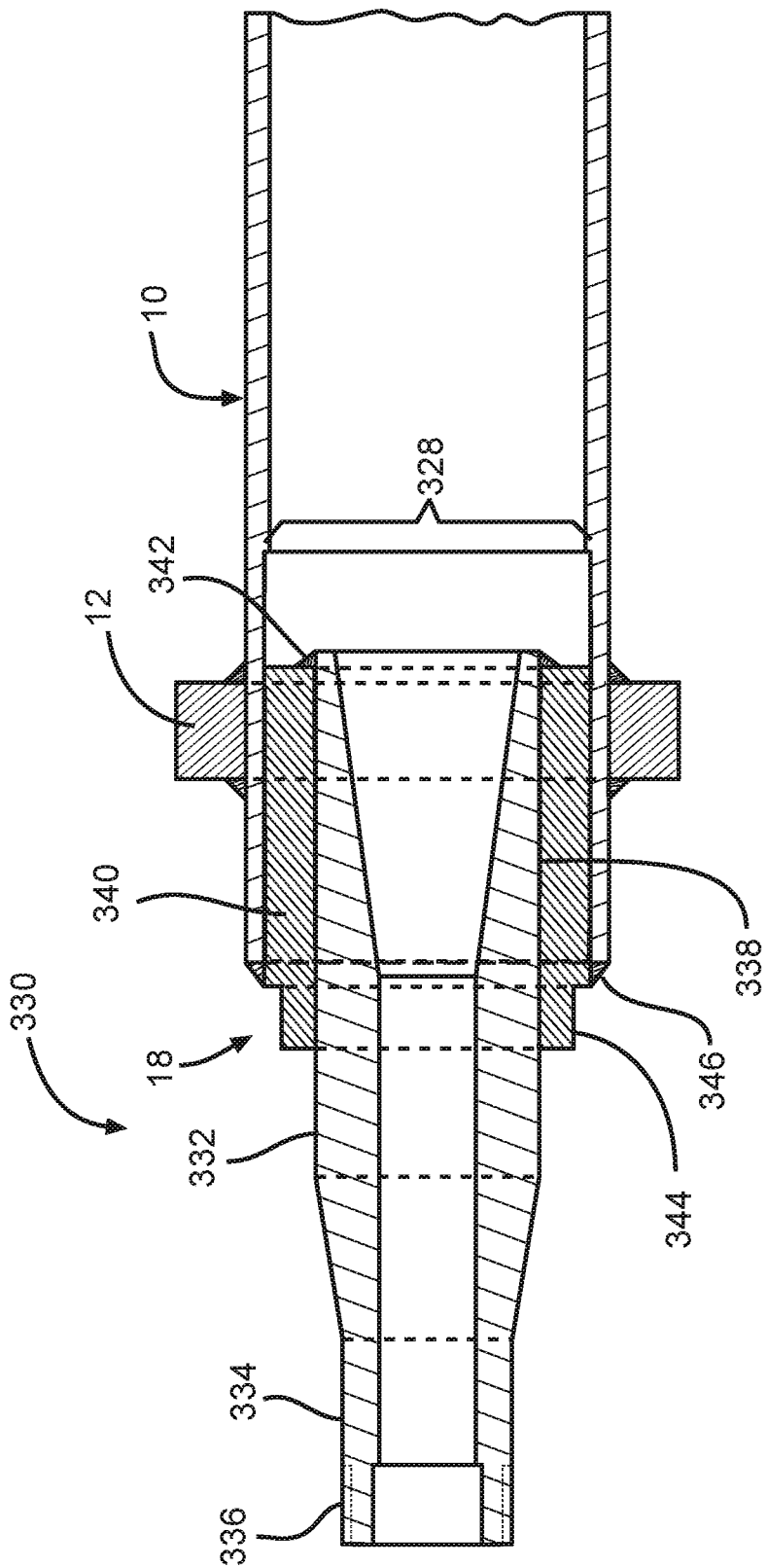

FIG. 13 is a full, sectional view of a second axle repair method according to the present invention utilizing the mounting assembly and boring machine described herein and a spindle, seal ring and liner with at least one plug weld inboard of a spider plate, and FIG. 14 is a full, sectional view of a third axle repair method according to the present invention utilizing the mounting assembly and boring machine described herein and a spindle and seal ring without plug welds.

DETAILED DESCRIPTION

The following description is merely exemplary in nature and is not intended to limit the present disclosure, application, or uses.

Figure 1:
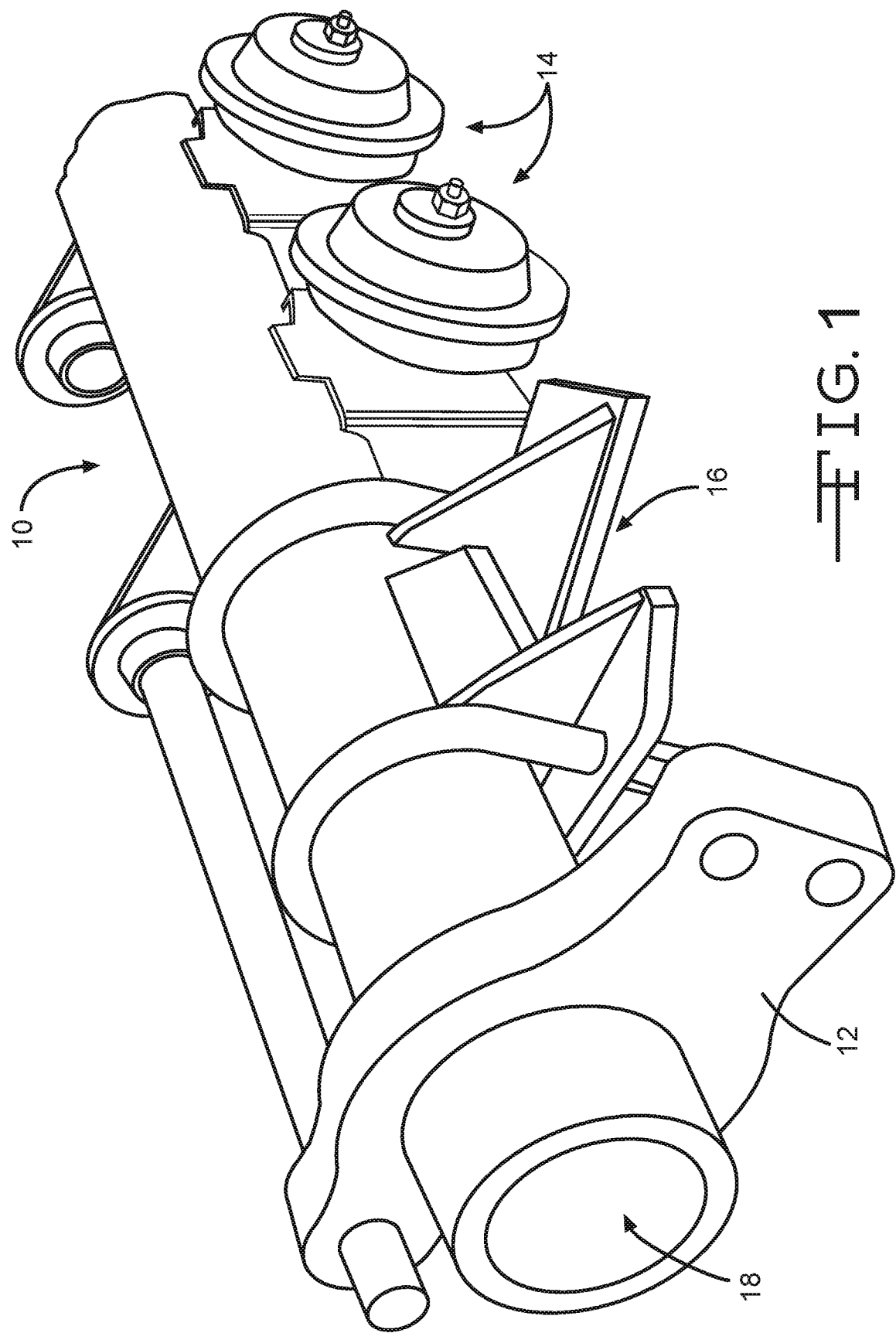
FIG. 1 is a perspective view of a trailer axle and certain components of the brake and suspension systems with the damaged terminal portion of the axle removed.

With reference to FIG. 1, a currently popular, hollow, cylindrical axle undergoing repair is illustrated and generally designated by the reference number 10. The hollow, cylindrical axle 10 typically and routinely includes a pair of spider plates 12 (one of which is illustrated) which are associated with and to which brake components (not illustrated) are secured. The axle 10 also includes pneumatic brake operators 14 and clamps 16 which secure suspension components such a springs (not illustrated) to the axle 10. In FIG. 1, the damaged terminal portion (not illustrated) of the axle 10 has been removed, preferably by sawing, so that a relatively smooth, uniform and undamaged cylindrical open end 18 of the axle 10 outboard of the spider plate 12 remains.

Figure 2:
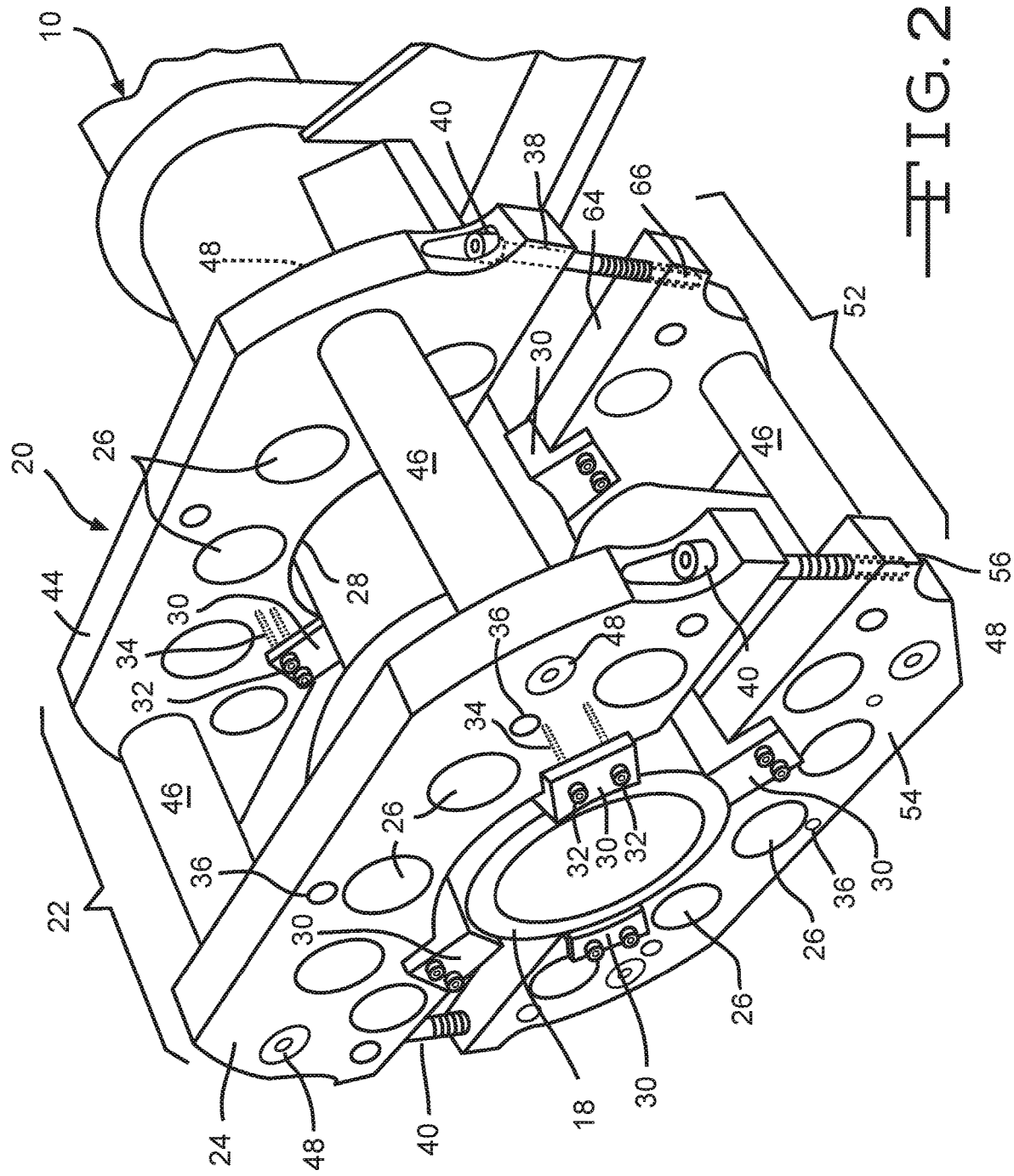
FIG. 2 is a perspective view of the axle of FIG. 1 with a boring machine mounting assembly according to the present invention secured thereto.
Figure 3:
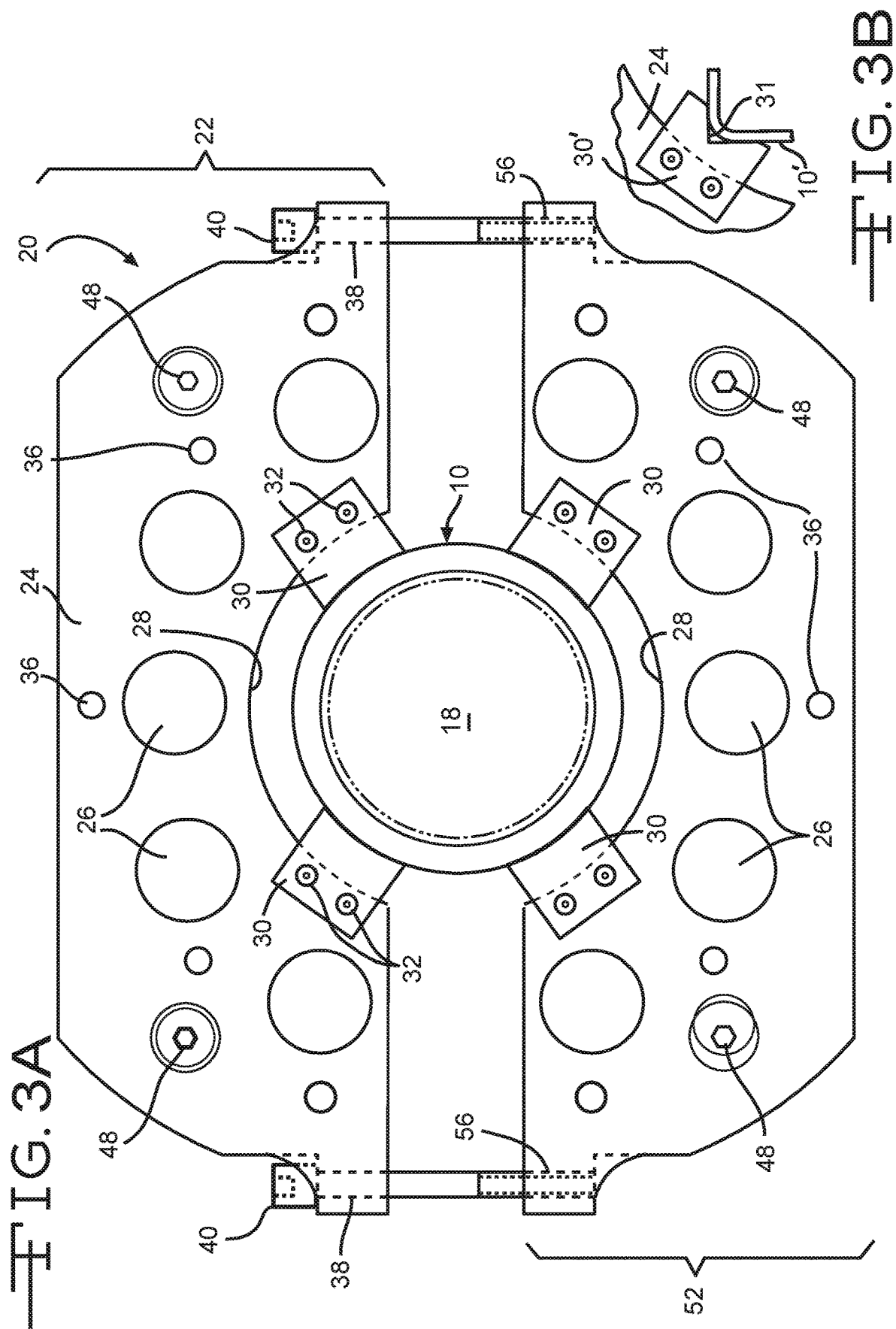
FIG. 3A is a front view of the boring machine mounting assembly according to the present invention.
FIG. 3B is an enlarged, fragmentary view of a portion of a boring machine mounting assembly according to the present invention adapted for use with square axles.

With reference now to FIGS. 2 and 3A, a mounting assembly 20 according to the present invention is shown in position on the axle 10. The mounting assembly 20 includes a first or upper section or portion 22 and a second or lower section or portion 52. Because the first section 22 and the second section 52 are substantially identical, only the first section 22 will be fully described, as will the differences between the first section 22 and the second section 52.

The first or upper section or portion 22 includes a front, flat, generally rectangular body or clamp 24 which is preferably fabricated of aluminum to save weight and may include a plurality of weight saving openings 26, as and if desired. The front body or clamp 24 includes a large, generally centrally disposed radiused opening 28 along its lower edge. At two locations about the inner circumference of the radiused opening 28 are disposed one of a pair of jaws 30 having an inner curved (radiused) surface which contacts the axle 10. The jaws 30 are preferably disposed at locations 60° from the vertical, that is, 30° above the horizontal. While these locations have been found to be preferable, they may be adjusted to suit other applications and operational considerations, as desired or necessary.

The jaws 30 are secured to the front body 24 by threaded fasteners 32 such as cap screws or similar fasteners which are received within through threaded openings 34 in the front body 24. As such, the positions of the jaws 30 are non-adjustable. However, it will be appreciated that since the threaded openings 34 pass entirely through the front body 24, the jaws 30 may, if desired, be mounted on the opposite (inside) face of the front body 24. The incorporation of the jaws 30 which contact the outside surface of the axle 10 at defined locations has been found to improve centering of the mounting assembly 20 on the axle 10. However, and as indicated by the phantom lines in FIG. 3A, in order to accommodate axles 10 of different outside diameters, the radial size or thickness of the jaws 30 and the radius of the inner curved surface may be varied. Accordingly, it should be understood that the invention contemplates the use of sets of jaws 30 of different radial sizes or thicknesses. Moreover, and as illustrated in FIG. 3B, the jaws 30' may define right angle notches 31 which securely engage certain axles 10' which are square.

A second plurality of through openings 36 arranged in a bolt circle receive fasteners which attach the adjusting base 70 as will be described subsequently. As utilized herein, the term "bolt circle" refers to an arrangement of features such as openings or apertures at generally equal circumferentially spaced intervals and at the same distance (radius) from a fixed center. At each end of the front body or clamp 24 are disposed a respective one of a pair of through apertures 38 which receive threaded fasteners 40 which extend into the second or lower section 52 and secure it to the first or upper section 22 as will be described subsequently.

Directly behind and axially aligned with the front body or clamp 24 of the first or upper section 22 is a rear body or clamp 44. The rear body or clamp 44 is essentially identical to the front body or clamp 24 and includes the weight saving openings 26, the radiused opening 28, the jaws 30, the threaded fasteners 32, the through threaded openings 34, the pair of through apertures 38 and the pair of threaded fasteners 40. Since the rear body or clamp 44 is not attached to the adjusting base 70, it need not include the second plurality of through openings 36 although in view of manufacturing considerations and weight, they may be included. The front body or clamp 24 is rigidly secured to the rear body or clamp 44 by a pair of stanchions or spacers 46 and a plurality of suitable recessed threaded fasteners 48 such as cap screws which extend through aligned openings in the front and rear bodies 24 and 44.

The second or lower section or portion 52 likewise includes a front body or clamp 54 and a rear body or clamp 64. Both of the front and rear clamps 54 and 64 preferably include the weight saving openings 26, the radiused opening 28, the jaws 30, the threaded fasteners 32 and the through threaded openings 34. Once again, the front body or clamp 54 includes the second plurality of through openings 36 while the rear body or clamp 64, since it is not connected to the adjusting base 70, need not. Furthermore, the front body or clamp 54 is rigidly secured to the rear body or clamp 64 by a pair of stanchions or spacers 46 and suitable recessed threaded fasteners 48 such as cap screws which extend through openings in the front and rear bodies 54 and 64. Finally, and distinct from the front body or clamp 24 and the rear body or clamp 44 of the first or upper section 22, the front body or clamp 54 and a rear body or clamp 64 include threaded openings 56 and 66 at their ends which receive the threaded fasteners 40 extending from the clamps 24 and 44 of the first or upper section 22. The threaded fasteners 40 are utilized to attach the first or upper section 22 of the mounting assembly 20 to the second or lower section 52 and to tightly secure the mounting assembly 20 to the axle 10 as illustrated in FIG. 2.

Figure 4:
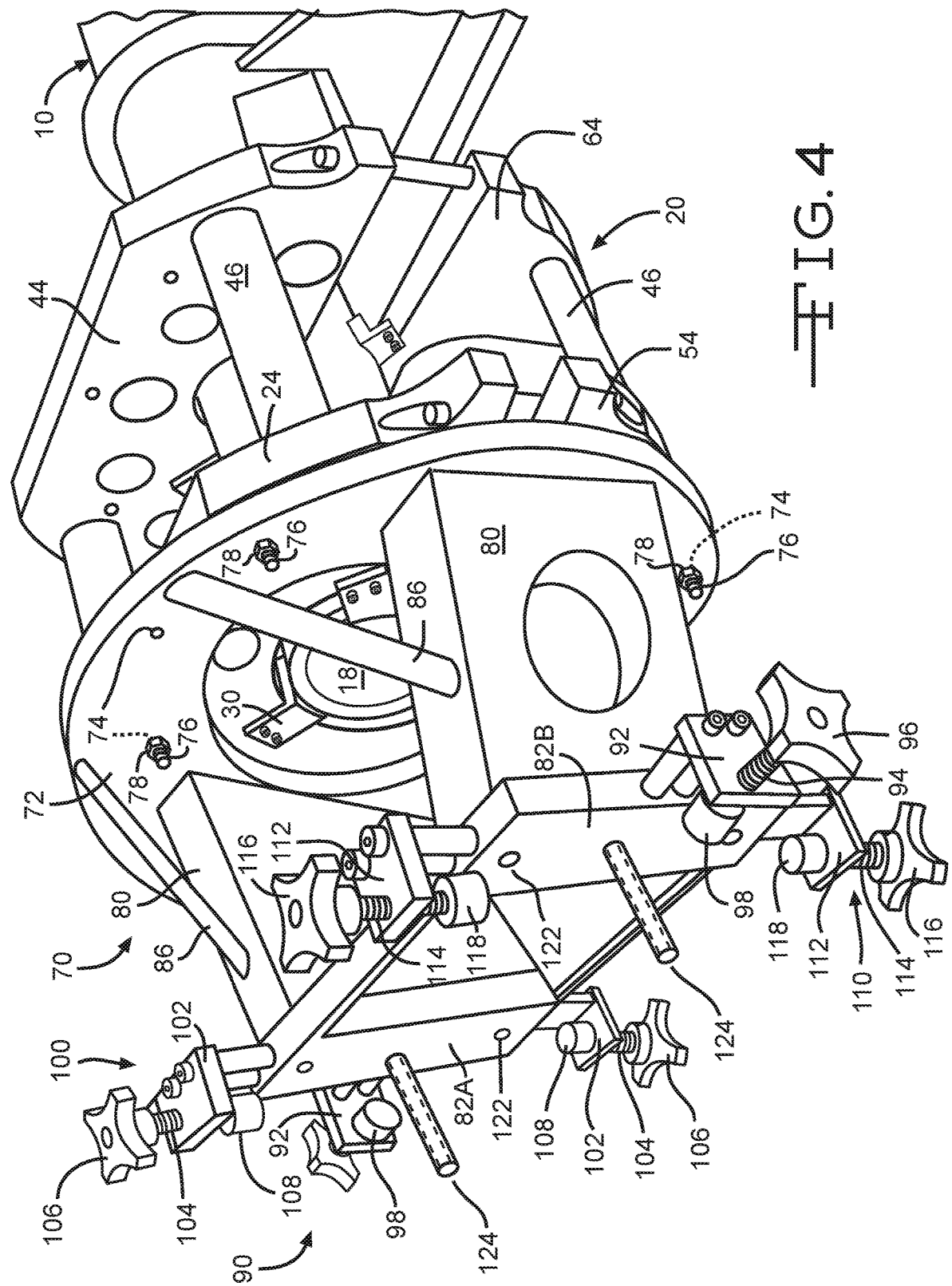
FIG. 4 is a perspective view of the boring machine mounting assembly and adjusting base according to the present invention secured to the trailer axle of FIG. 1.

Turning now to FIG. 4, the adjusting base 70 will be described. The adjusting base 70 is illustrated in position on the outer flat faces of the mounting assembly 20. The adjusting base 70 includes an annular baseplate 72 having a size (diameter) approximately equal to the size (outer curved edges) of the mounting assembly 20. The annular baseplate 72 includes a plurality of through openings 74 which align with three of the second plurality of through openings 36 of the first or upper section 22 and three of the second plurality of through openings 36 of the second or lower section 52. Extending through these aligned openings 36 and 74 are preferably six threaded fasteners 76 which receive nuts 78 which may be tightened to secure the adjusting base 70 to the mounting assembly 20.

Axially spaced from and secured to the annular baseplate 72 by two oblique trapezoidal braces 80 is a rectangular panel member that defines a left and right pair of rectangular plates 82A and 82B having flat, co-planar surfaces 84 which are also parallel to the annular baseplate 72. The braces 80 are preferably secured to the annular baseplate 72 and the rectangular plates 82A and 82B by welding and for additional rigidity, pairs of upper and lower oblique struts 86, also preferably secured by welding, may be disposed between the baseplate 72 and each of the trapezoidal braces 80.

Arranged in cooperating pairs adjacent the pair of rectangular plates 82A and 82B are three pairs of adjustment assemblies. A first pair of adjustment assemblies 90 each includes a mounting plate 92 supported by stanchions or standoffs which receives a threaded adjustment screw 94 having a thumbwheel 96 at one end and a bumper 98 at the opposite end. One of the first pair of adjustment assemblies 90 is secured to the left side of the left rectangular plate 82A and the other of the first pair of adjustment assemblies 90 is secured to the right side of the right rectangular plate 82B, preferably in axial alignment with the adjustment assembly 90 on the left rectangular plate 82A. The first pair of adjustment assemblies 90 cooperate with a bearing pack 130, illustrated in FIG. 5, to positively translate it horizontally, i.e., left and right, relative to the adjusting base 70. As such, the threaded adjustment screws 94 are utilized and function in opposition. That is, to translate the bearing pack to the left, the thumbwheel 96 and adjustment screw 94 on the left is rotated counterclockwise while the thumbwheel 96 and the adjustment screw 94 on the right is rotated clockwise. To effect translation of the bearing pack 130 to the right, opposite actions are undertaken.

A second pair of adjustment assemblies 100 are secured to the left rectangular plate 82A and are oriented along an axis perpendicular to the axis extending between the first pair of adjustment assemblies 90. Once again, each of the second pair of adjustment assemblies 100 includes a mounting plate 102 supported by stanchions or standoffs which receives a threaded adjustment screw 104 having a thumbwheel 106 at one end and a bumper 108 at the opposite end. The second pair of adjustment assemblies 100, as described above, are typically utilized in opposition to adjust the vertical position of the left side or portion of the bearing pack 130 along a second, vertical axis perpendicular, or generally perpendicular, to the first, horizontal axis.

In a similar fashion, and disposed on the right rectangular plate 82B are a third pair of adjustment assemblies 110. The third pair of adjustment assemblies 110 are oriented along an axis parallel to, and spaced from, the axis of the second pair of adjustment assemblies 100 (and perpendicular to the axis of the first pair of adjustment assemblies 90). Each of the third pair of adjustment assemblies 110 includes a mounting plate 112 supported by stanchions or standoffs which receives a threaded adjustment screw 114 having a thumbwheel 116 at one end and a bumper 118 at the opposite end. The third pair of adjustment assemblies 110, as described above, are also typically utilized in opposition to adjust the vertical position of the right side or portion of the bearing pack 130 along a second, vertical axis perpendicular, or generally perpendicular, to the first, horizontal axis.

Each of the pair of rectangular plates 82A and 82B include a plurality of threaded apertures 122. Threaded into the threaded apertures 122 (preferably those near the respective centers of the rectangular plates 82A and 82B) are a pair of threaded studs 124. Alternatively, the apertures 122 may be unthreaded and conventional machine bolts (not illustrated) may extend therethrough. The threaded studs 124 and cooperating nuts 142 are utilized to secure the bearing pack 130, illustrated in FIG. 5, to the adjusting base 70.

Figure 5:
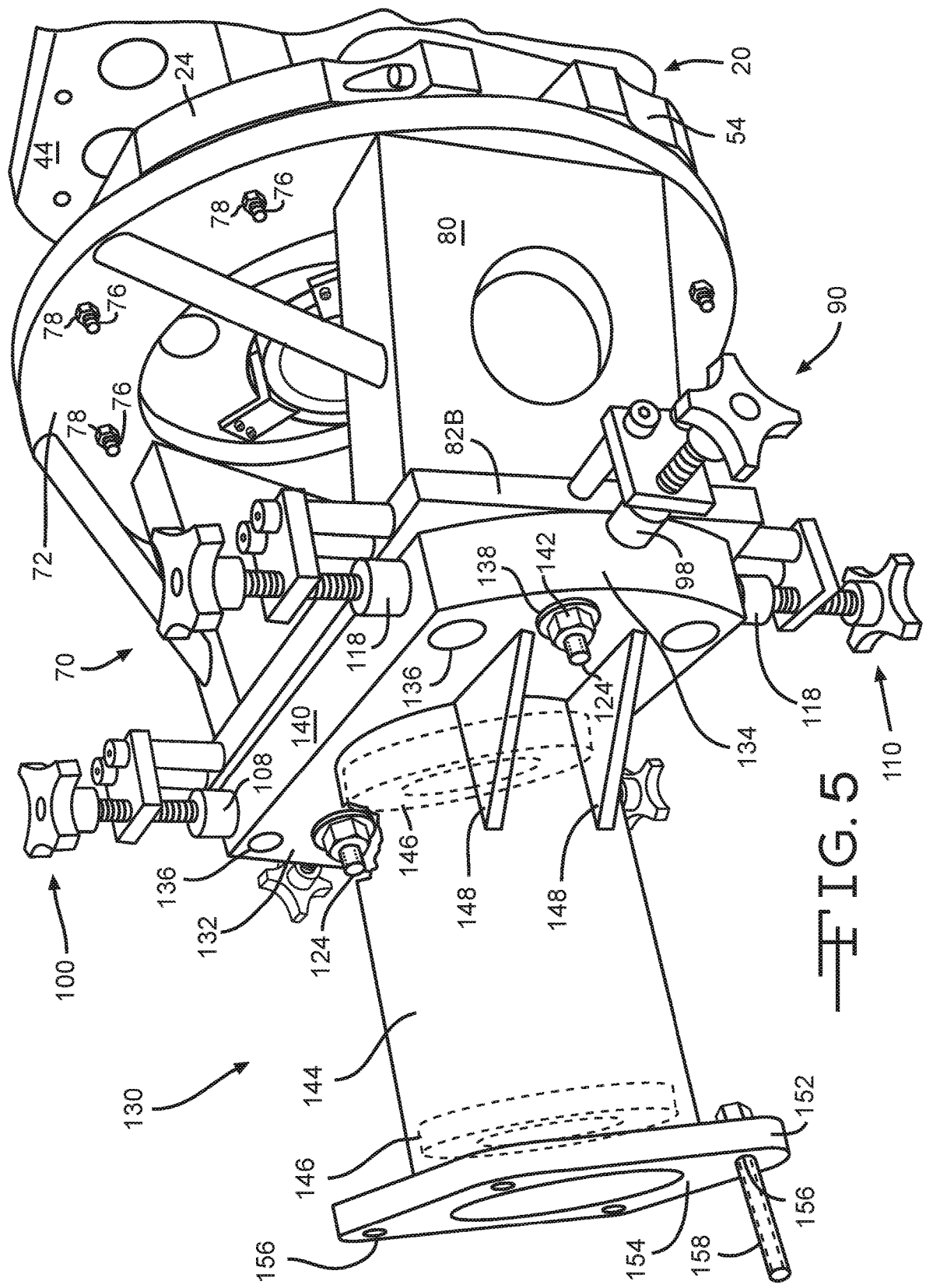
FIG. 5 is a perspective view of the boring machine mounting assembly, adjusting base and bearing pack according to the present invention secured to the trailer axle of FIG. 1.

Referring now to FIG. 5, the bearing pack 130 includes a generally rectangular flat plate 132 preferably having significant thickness, on the order of 0.5 inches to 0.75 inches (12.7 mm to 19.1 mm) which thus defines a wide edge surface 134. The rectangular plate 132 has a length and width approximately equal to the horizontal and vertical separations between the pairs of bumpers 98 and 108 and 118 when the respective pairs of threaded shafts 94 and 104 and 114 are approximately at their mid-positions in the brackets 92 and 102 and 112. As illustrated in FIG. 5, the bumpers 98, 108 and 118 engage the edge surface 134 of the flat plate 132 and, by rotation of the adjustment assemblies 90, 100 and 110 described above, facilitate horizontal and vertical, repositioning of the bearing pack 130 relative to the mounting assembly 20.

The rectangular flat plate 132 includes a plurality of relatively large through apertures 136 which may receive a respective one of the studs 124 (or machine bolts), one of which extends from each of the rectangular plates 82A and 82B. The through apertures 136 are sufficiently large, relative to the studs 124 or bolts, such that horizontal and vertical translation and repositioning of the rectangular flat plate 132 on the surfaces 84 of the rectangular plates 82A and 82B may be readily accommodated. Pairs of conventional washers 138 and nuts 142 are utilized to secure the bearing pack 130 to the adjusting base 70 after it has been positioned in an appropriate position, as described below, by the adjustment assemblies 90, 100 and 110.

The bearing pack 130 includes an elongate cylindrical housing 144 which receives and supports a pair of axially spaced-apart ball bearing assemblies 146. The cylindrical housing 144 may be secured to the rectangular flat plate 132 by welding and welded gussets 148 may be utilized to reinforce the bearing pack 130. The cylindrical housing 144 terminates in a square plate 152 having a flat face 154 which is parallel to the end face of the rectangular flat plate 132. The square plate 152 is preferably secured to the cylindrical housing 144 by welding and includes a plurality of through openings 156 which receive a like plurality of machine bolts 158 which selectively attach a boring bar drive assembly 170, illustrated in FIG. 7, to the bearing pack 130.

Figure 6:
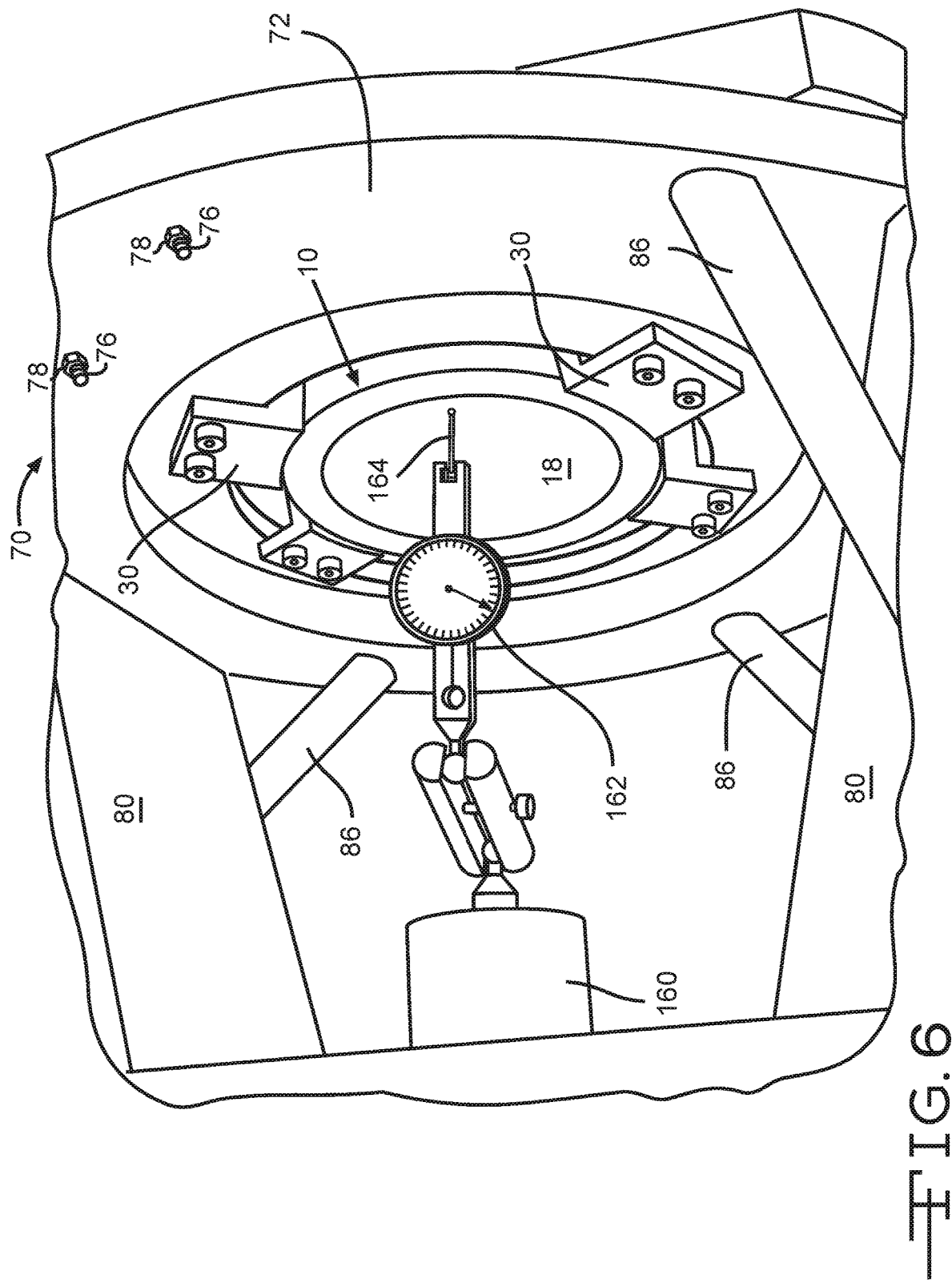
FIG. 6 is a perspective view of a step of the repair method in which a dial indicator is attached to a shaft disposed in the bearing pack and the bearing pack is moved to center the shaft in the axle opening.

Referring now to FIGS. 5 and 6, in order to ensure that the subsequent boring procedure uniformly removes material from the cylindrical axle 10 and achieves uniform wall thickness, it is necessary that the axis of the bearing pack 130 be positioned co-axially, or as substantially co-axially as can reasonably be achieved, to the open end 18 of the hollow cylindrical axle 10. Hence, a shaft 160, which may be a boring bar, is inserted into the ball bearing assemblies 146 of the bearing pack 130 and a dial indicator 162 is attached to the end of the shaft 160 proximate the open end 18 of the hollow axle 10. The sensing probe 164 and the dial indicator 162 are then adjusted, that is, positioned with the sensing probe 164 inside that axle 10, so that the dial indicator 162 indicates run-out. The shaft 160 and the dial indicator 162 are then rotated and the adjustment assemblies 90, 100 and 110 of the adjusting base 70 are adjusted to horizontally and vertically translate the bearing pack 130 to minimize run-out. The nuts 142 on the studs 124 are then tightened to maintain this aligned position of the bearing pack 130 with the inside diameter of the axle 10.

Figure 7:
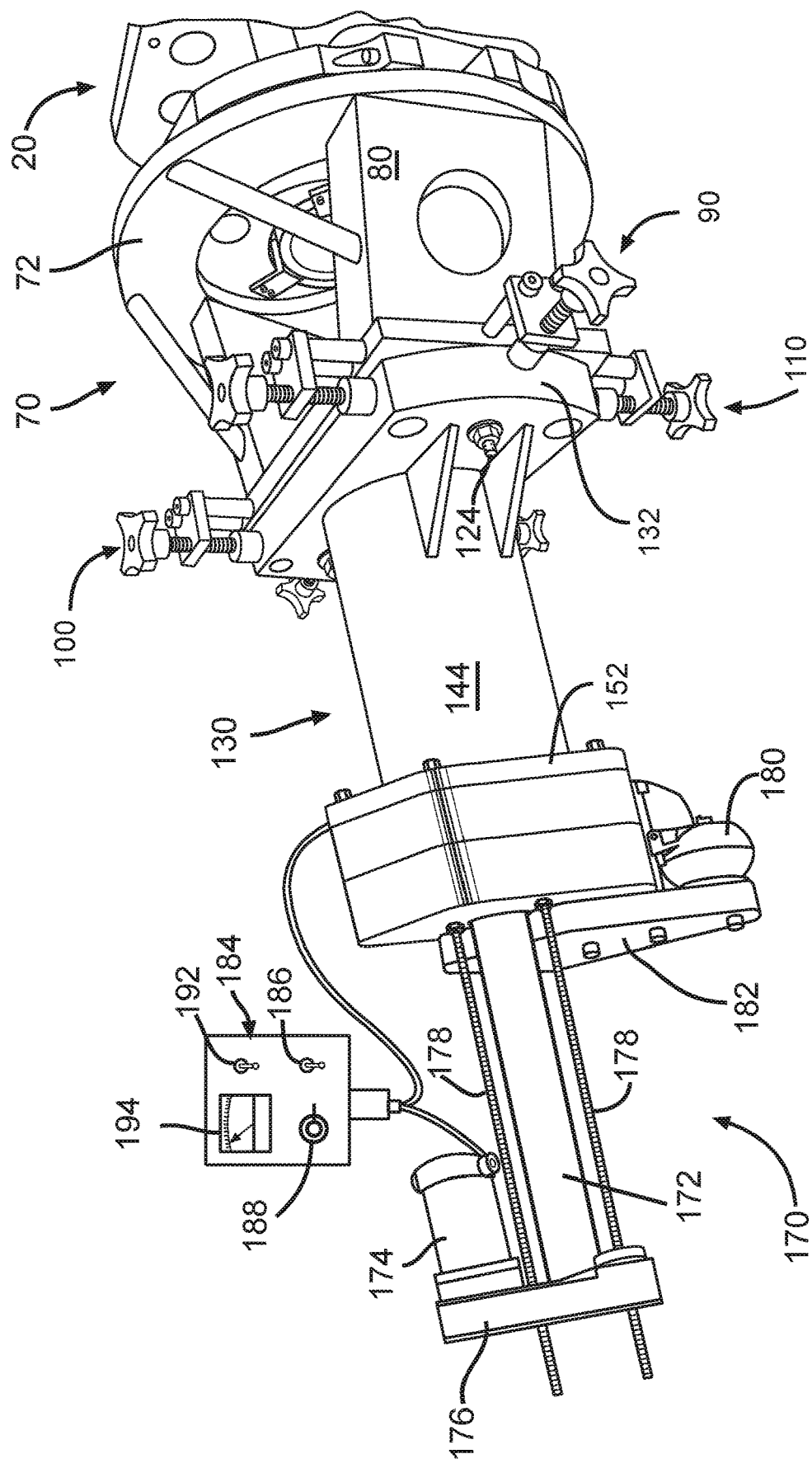
FIG. 7 is a perspective view of the boring machine mounting assembly, adjusting base, bearing pack and drive unit according to the present invention secured to the trailer axle of FIG. 1.

Referring now to FIG. 7, the portable drive or power unit 170 is illustrated in position on the bearing pack 130. The drive or power unit 170 includes two electric motors, speed reduction assemblies and control devices that provide rotation and bi-directional axial translation of a boring bar 172. A first bi-directional and variable speed electric motor 174 rotates a pair of captive threaded nuts (not illustrated) in a housing 176 which advances and retracts along a pair of stationary lead screws 178 which, in turn, advances and retracts the boring bar 172. A second electric motor 180 rotates the boring bar 172 at a constant speed through a speed reduction assembly 182. A controller 184 includes a first, three position switch 186 and a variable speed control 188 which selects the direction and speed of the first (feed) motor 174 and a second, on-off switch 192 which controls the second (boring bar) motor 180 and an ammeter which 194 indicates the current draw thereof. Further details of the portable drive or power unit 170 appear in my U.S. Pat. No. 7,066,690 which is hereby incorporated herein by reference in its entirety.

Figure 8:
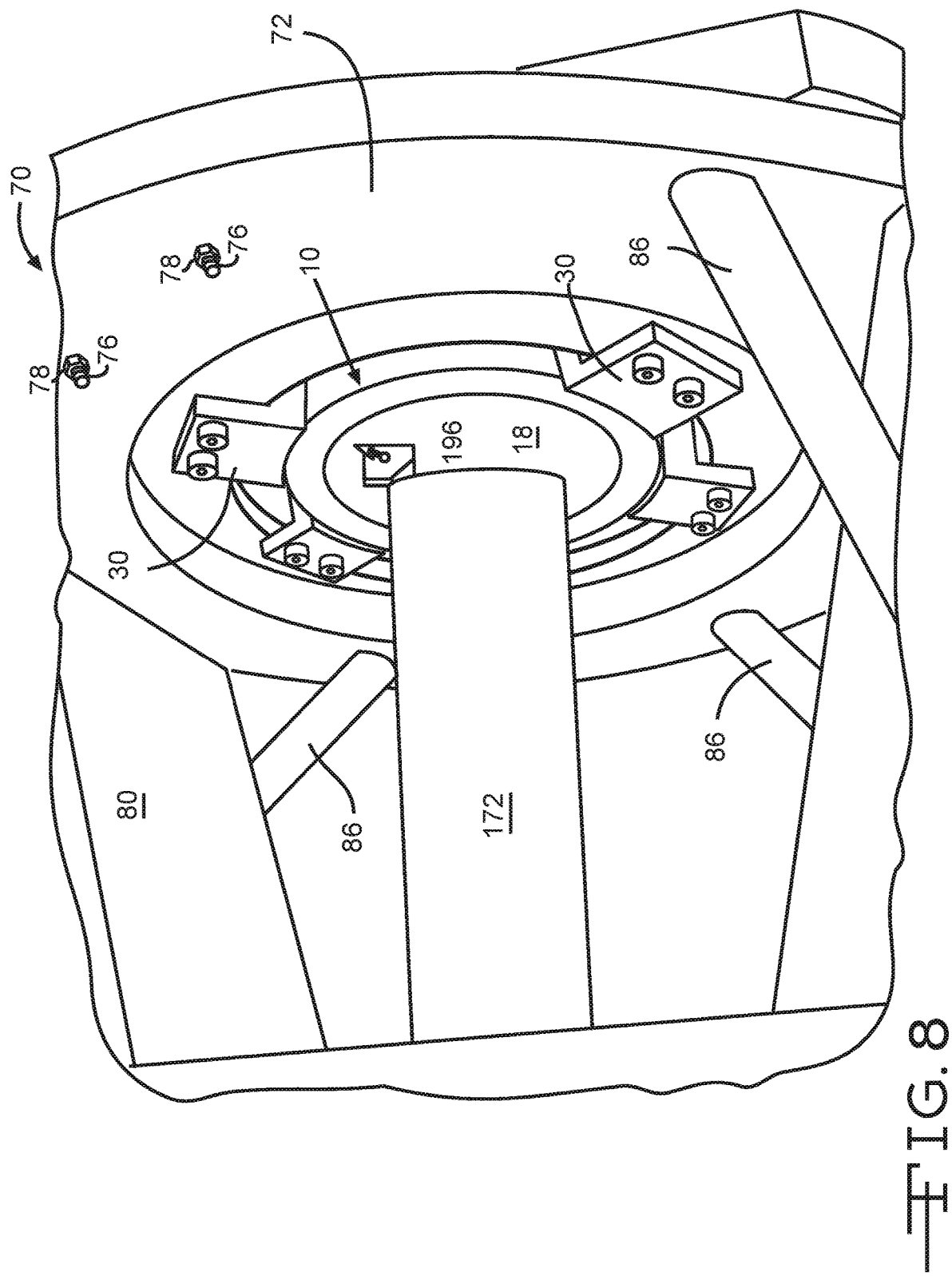
FIG. 8 is a fragmentary, perspective view of the axle, the adjusting base and boring bar according to the present invention.

Referring briefly to FIGS. 7 and 8, a boring bar 172 having a cutter 196 is installed in the bearing pack 130 and connected to the drive or power unit 170. The cutter 196 is adjusted to a first radial position to achieve a first, rough cut within the axle 10. The first switch 186 is activated to the "IN" position and the boring bar 172 is advanced to the open end 18 of the axle 10. The second switch 192 is then activated and a first rough boring pass into the axle 10 is undertaken. The first switch 192 is then moved to the "OUT" position and the boring bar 172 retracts from the axle 10. The cutter 196 may then be advanced radially outwardly a small distance and the boring process repeated one or more additional times. Preferably, the radial position of the cutter 196 will be adjusted such that each pass of multiple passes will remove less material so that the finish of the inside of the axle 10 will improve with each pass. It should be appreciated that a boring machine having manual feed, rather than the automatic feed here disclosed, is both suitable and within the purview of this invention.

Figure 10:
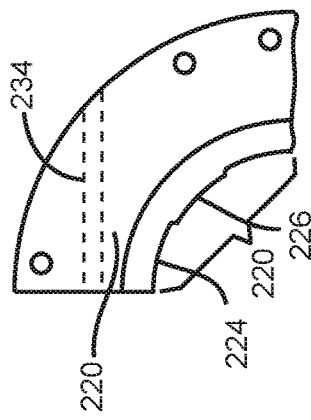
FIG. 10 is an enlarged, fragmentary view of a portion of the alternate boring machine split ring mounting assembly showing one of the internal, curved projections.
Figure 9:
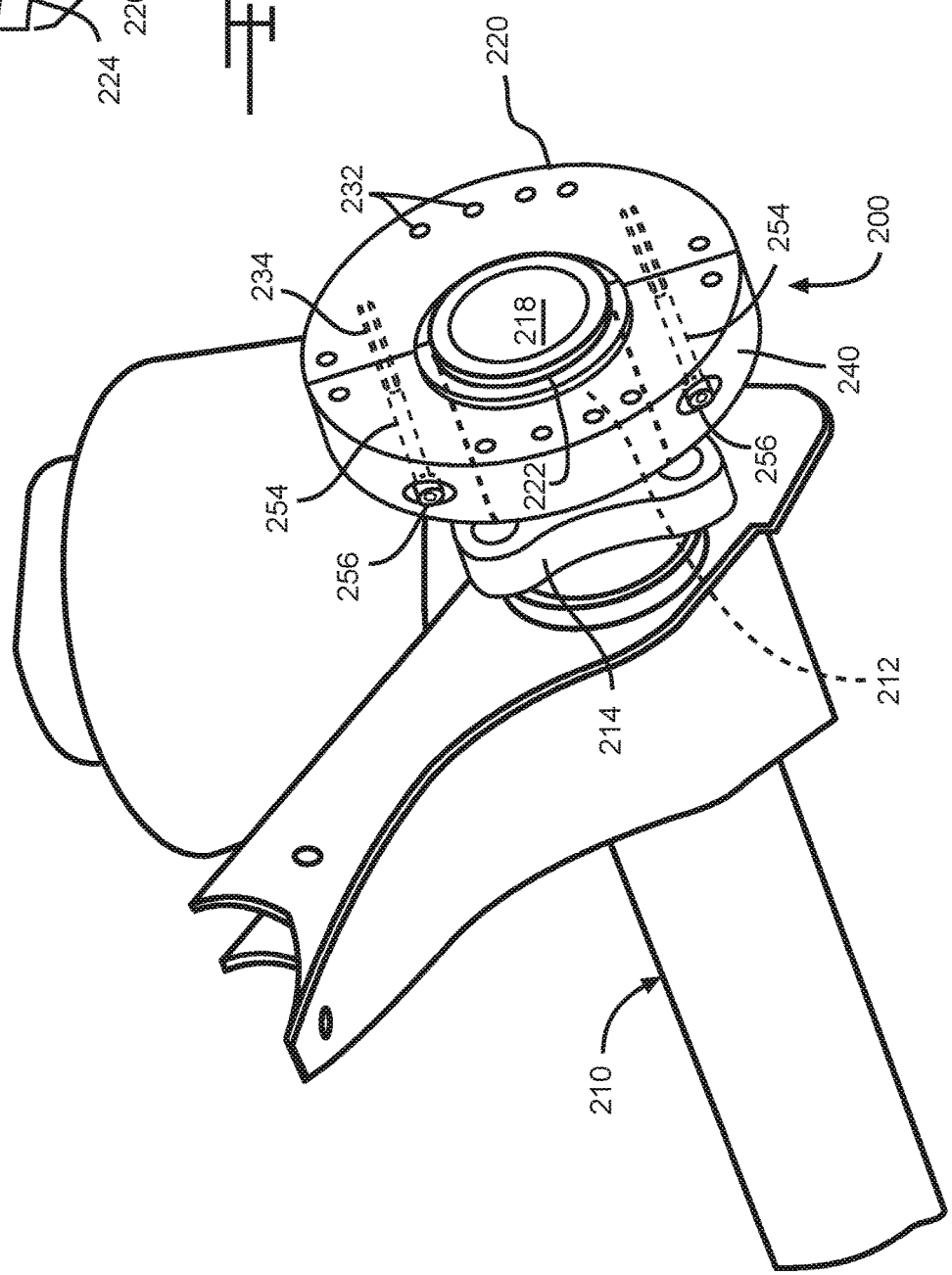
FIG. 9 is a perspective view of another trailer axle with the damaged portion removed and an alternate boring machine split ring mounting assembly according to the present invention secured thereto.

Referring now to FIGS. 9 and 10, an alternate mounting assembly 200 is illustrated. The alternate mounting assembly 200 is preferably utilized with certain axles 210 that are fabricated with a machined outer surface 212 outboard of the spider plate 214. Once again, the damaged outer portion of the spindle (not illustrated) has been removed, preferably by sawing, so that a relatively smooth, uniform and undamaged cylindrical open end 218 of the axle 210 adjacent the machined outer surface 212 remains. The alternate mounting assembly 200 mounts on the machined outer surface 212.

The alternate mounting assembly 200 is essentially a ring split along a diameter and includes a first, semi-circular section 220 and a substantially identical second, semi-circular section 240. Because the first section 220 and the second section 240 are substantially identical, only the first section 220 will be fully described, as will the differences between the first section 220 and the second section 240. As illustrated in FIG. 10, the first section 220 defines a center, semi-circular opening 222 having a curved inner wall 224 which includes a pair of spaced apart, curved, inwardly extending lugs or projections 226. The pair of lugs or projections 226 are preferably disposed at angles of 30° from the split and facilitate secure mounting on an axle 210 that may be slightly out of round. Spaced in a bolt circle about the center opening 222 are a plurality of threaded openings 232. Inboard of the ends of the first section 220, adjacent the split, are tangentially oriented threaded openings 234.

The second, semi-circular section 240 also defines a center, semi-circular opening 222 having a curved inner wall 224 which includes a pair of spaced apart, curved, inwardly extending lugs or projections 226. The pair of lugs or projections 226 are also preferably disposed at angles of 30° from the split and facilitate secure mounting on an axle 210 that may be slightly out of round. Spaced in a bolt circle about the center opening 222 are a plurality of threaded openings 232. Inboard of the ends of the second section 240, adjacent the split, are tangentially oriented openings 254 which, when the first and second sections 220 and 240 are assembled, aligns with the threaded openings 234. A pair of cap screws 256 or similar fasteners may be inserted into the openings 254 and into the threaded openings 234 and tightened to secure the alternate mounting assembly 200 to the outer machined surface 212 of the damaged axle 210.

Figure 11:
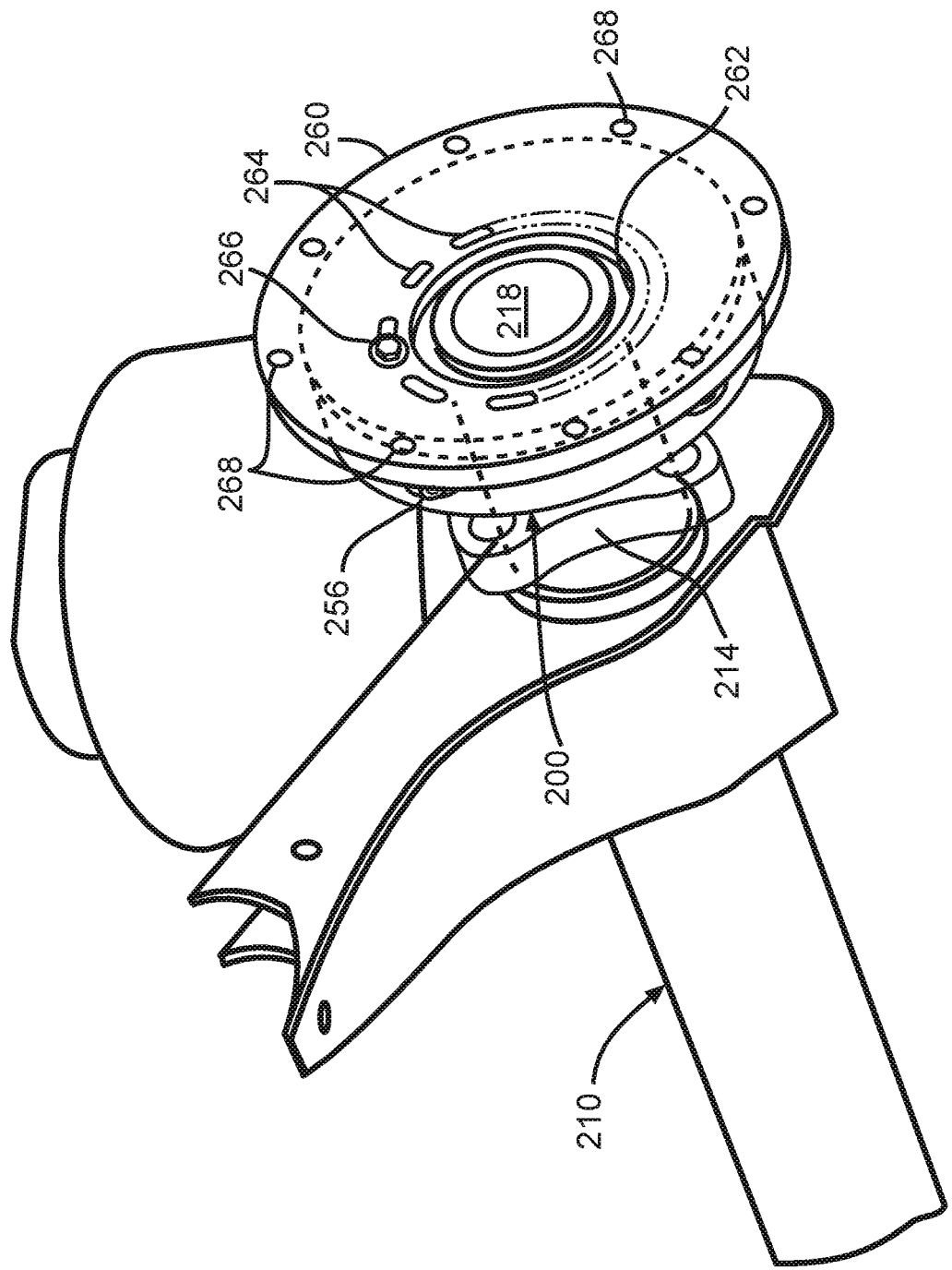
FIG. 11 is a perspective view of the trailer axle of FIG. 9 with the alternate boring machine split ring mounting assembly and an adapter plate according to the present invention secured thereto.

Referring now to FIG. 11, an adapter plate 260 is shown in position on the assembled and mounted alternate mounting assembly 200. The adapter plate 260 includes a large center opening 262 which accommodates the boring bar 172 and an array of arcuate slots 264 disposed about the center opening 262. The arcuate slots 264 generally align with the threaded openings 232 in the first, semi-circular section 220 and the second, semi-circular section 240 when it is clamped on an axle 210 as illustrated and allow limited rotation relative to the alternate mounting assembly 200. A plurality of machine bolts 266 extending through the arcuate slots 264 and into the threaded openings 232 may be utilized to secure the adapter plate 260 to the alternate mounting assembly 200. The adapter plate 260 also includes a bolt circle of through openings 268 which may receive threaded fasteners 76 (illustrated in FIG. 4) such as machine bolts which, with nuts 78 (also illustrated in FIG. 4), secure the adapter plate 260 to the adjusting base 70 (also illustrated in FIG. 4).

Figure 12:
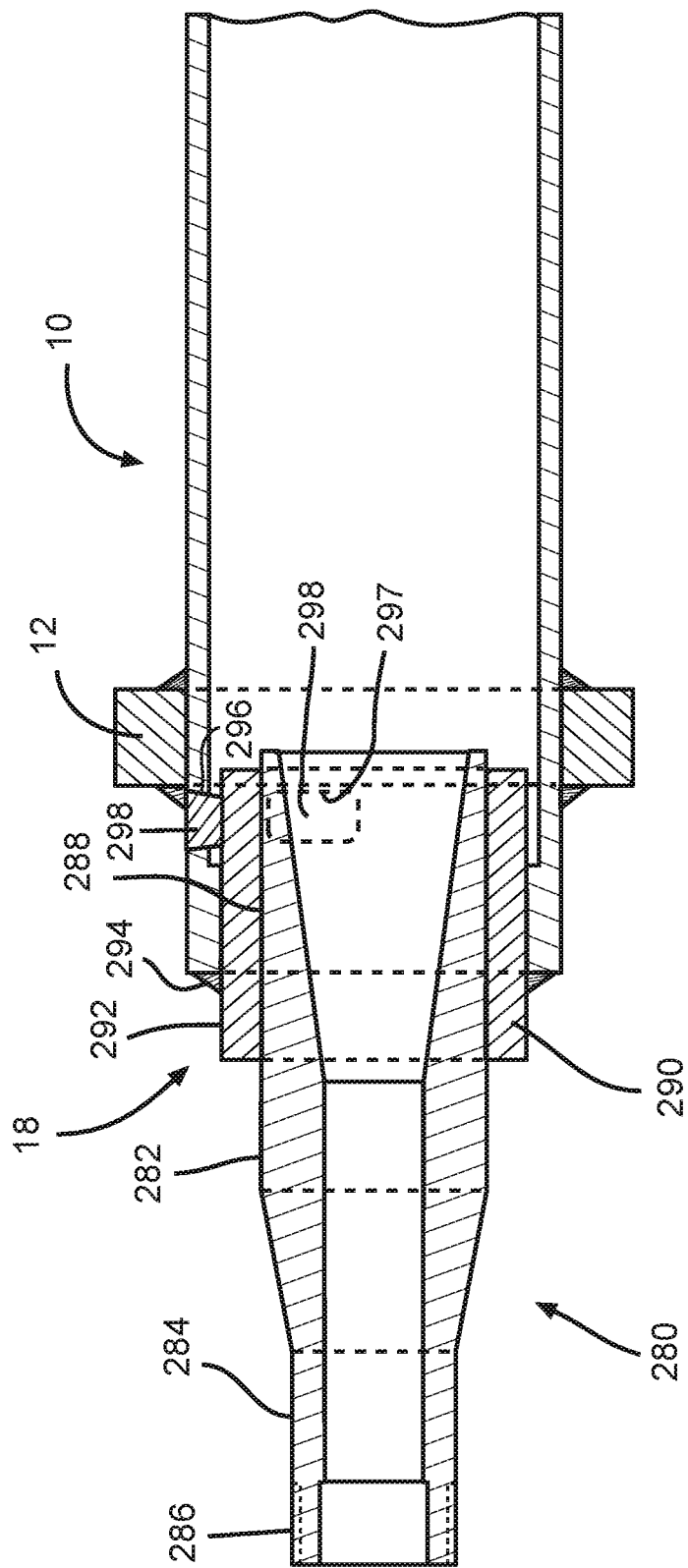
FIG. 12 is a full, sectional view of a first axle repair method according to the present invention utilizing the mounting assembly and boring machine described herein and a spindle and seal ring with at least one plug weld outboard of a spider plate.

Referring now to FIG. 12, a first embodiment of an axle repair method is illustrated. The axle 10 which has had a damaged portion (not illustrated) removed includes the spider plate 12 and an undamaged cylindrical open end 18 which has been bored out to a desired diameter with the apparatus and according to the method described above. A replacement spindle 280 having an inner bearing surface 282, an outer bearing surface 284 and a threaded terminal portion 286 includes an elongate cylindrical portion 288, preferably having the same outside diameter as the inner bearing surface 282. Disposed about this cylindrical portion 288 is a seal ring 290 which is retained thereon by an interference fit subsequent to heating to approximately 350° F. to 400° F. (177° to 204° C.) and placement on the cylindrical portion 288 of the spindle 280. This and the other interference fits described below are standard practice interference fits and, given the sizes of the components generally utilized, will be in the approximate range of 0.003 inches to 0.008 inches. It should be appreciated that as an alternative to the separate spindle 280 and seal ring 290, these components may be fabricated as a single component, so that the spindle 280 includes the seal ring 290, by, for example, forging.

The seal ring 290 includes an oil seal surface 292 and extends approximately from the inboard end of the spindle 280 to proximate the inner edge of the inner bearing surface 282. The outside diameter of the seal ring 290 is several thousandths of an inch greater than the bored, inside diameter of the axle 10. The spindle 280 and the seal ring 290 are secured to the axle 10 by, first of all, an interference fit which is achieved by heating the axle to approximately 350° to 400° F. and placement of the spindle 280 and the seal ring 290 into the open end 18 of the axle as shown in FIG. 12. Next, a circumferential weld bead 294 is placed about the seal ring 290 at the corner formed by the oil seal surface 292 and the end 18 of the axle 10. Finally, a single opening 296 at the top of the axle 10 or a pair of openings 297 in both sides of the axle 10 outboard of the spider plate 12 at approximately the 10 o'clock and 2 o'clock positions, i.e., approximately 60° off the vertical, are ground or cut into the axle 10 and on or a pair of plug welds 298 are installed which extend between and secure the seal ring 290 to the axle 10.

Referring now to FIG. 13, a second embodiment of an axle repair method is illustrated. Once again, a damaged portion (not illustrated) has been removed from the axle 10 which includes the spider plate 12 and the undamaged cylindrical open end 18 and the axle 10 have been bored out to a desired diameter with the apparatus and according to the method described above. A replacement spindle 300 having an inner bearing surface 302, an outer bearing surface 304 and a threaded terminal portion 306 includes an elongate cylindrical portion 308, preferably having the same outside diameter as the inner bearing surface 302. Disposed about the cylindrical portion 308 is a seal ring 310 which is retained thereon by an interference fit subsequent to heating to approximately 350° to 400° F. and placement on the cylindrical portion 308 of the spindle 300.

The seal ring 310 includes an oil seal surface 312 and extends approximately from the inner edge of the inner bearing surface 302 to the outer edge of the spider plate 12. An annular sleeve or liner 314 is disposed about the inner end of the spindle 300 and secured there by inner and outer circumferential welds 316. As an alternative construction, it should be appreciated that the separate spindle 300, the seal ring 310 and the liner 314 may be fabricated as a single component, so that the spindle 300 includes the seal ring 310 and the liner 314, by, for example, forging. The outside diameter of the sleeve or liner 314 is slightly larger than the bored inside diameter of the axle 10. Once again, the axle 10 is heated to approximately 350° to 400° F. and the spindle 300, the seal ring 310 and the sleeve 314 are inserted into the open end 18 of the axle 10. Next, a circumferential weld bead 318 is placed about the seal ring 310 at the end of the axle 10 and finally a single opening 322 is ground or cut at the top of the axle 10 or a pair of openings 323 are ground or cut into the axle 10 at the 10 o'clock and 2 o'clock positions in line with the annular sleeve or liner 314 and one or a pair of plug welds 324, extending between the axle 10 and the sleeve or liner 314 are installed.

Referring now to FIG. 14, a third embodiment of an axle repair method is illustrated. Once again, a damaged portion (not illustrated) has been removed from the axle 10 which includes the spider plate 12 and the undamaged cylindrical open end 18 and the axle 10 have been bored out to a desired larger inside diameter 328 with the apparatus and according to the method described above. Due to the nature and extent of material removal, multiple passes of the boring bar 172 are preferred such as at least a rough cut and a finish cut. A replacement spindle 330 having an inner bearing surface 332, an outer bearing surface 334 and a threaded terminal portion 336 includes an elongate cylindrical portion 338, preferably having the same outside diameter as the inner bearing surface 332. Disposed about this cylindrical portion 338 is a seal ring 340 which is retained thereon by an interference fit subsequent to heating it to approximately 350° to 400° F. and placement on the cylindrical portion 338 of the spindle 330. A circumferential weld bead 342 is placed between the inner end of the spindle 330 and the seal ring 340. As an alternative construction, it should be appreciated that the separate spindle 330 and seal ring 340 may be fabricated as a single component, so that the spindle 330 includes the seal ring 340 by, for example, forging.

The seal ring 340 includes an oil seal surface 344 and extends approximately from the inner edge of the inner bearing surface 332 to at least the inner edge of the spider plate 12. The outside diameter of the seal ring 340 is slightly smaller than the bored inside diameter 328 of the axle 10. Once again, the axle 10 is heated to approximately 350° to 400° F. and the spindle 330 and the seal ring 340 are inserted into the open end 18 of the axle 10. Last of all, a circumferential weld bead 346 is placed about the seal ring 340 at the end of the axle 10.

The description of the invention is merely exemplary in nature and variations that do not depart from the gist of the invention are intended to be within the scope of the invention. For example, it should be appreciated and understood that diverse automatic and manual boring and drilling equipment as well as cutting tools and cutting technologies may be readily used with the mounting devices and repair methods of the present invention. Such variations are not to be regarded as a departure from the spirit and scope of the invention.

What is claimed is:

1. A method of repairing a damaged motor vehicle axle comprising the steps of:
- assembling boring equipment having a boring axis to the vehicle axle;
- disposing a mounting assembly on the vehicle axle, wherein the mounting assembly comprises:
  - a first portion and a second portion identical to and spaced apart from the first portion, each of the first and second portions having a substantially rectangular shape with centrally-disposed radiused opening disposed along an edge, the radiused openings of the first and second portions facing one another, wherein the first portion is connected to the second portion with threaded fasteners engaged with one or more threaded openings formed in the first and second portions;
  - a jaw disposed about an inner circumference of the radiused openings of each of the first and second portions, the jaws having an inner radiused surface shaped to contact and secure the vehicle axle within the mounting assembly;
- aligning the boring axis of the boring equipment with an axis of the vehicle axle;
- boring the vehicle axle to a desired inside diameter;
- providing a replacement spindle assembly having an oil seal surface, an inner bearing surface, an outer bearing surface and a threaded terminal portion; the replacement spindle assembly having a region defining an outside diameter greater than the bored inside diameter of the vehicle axle;
- heating the vehicle axle to enlarge the vehicle axle to receive the region of the replacement spindle assembly in an interference fit manner;
- inserting the replacement spindle assembly into the bored vehicle axle;
- grinding or cutting at least one opening in the vehicle axle at approximately 10 o'clock and 2'clock positions or approximately 60° off of vertical, and installing a plug weld in the at least one opening which engages the replacement spindle assembly; and
- providing a circumferential weld between the replacement spindle assembly and an end of the vehicle axle.

2. The method of repairing a motor vehicle axle of claim 1 further including the step of providing a cylindrical liner and installing the cylindrical liner on an inner end of the replacement spindle assembly.

3. The method of repairing a motor vehicle axle of claim 2 further including the step of grinding or cutting at least one opening the vehicle at least one opening in the vehicle axle at approximately 10 o'clock and 2 o'clock positions or approximately 60° off of vertical, and installing a plug weld in the at least one opening which engages the cylindrical liner.

4. The method of repairing a motor vehicle axle of claim 1 wherein the oil seal surface resides on a seal ring that is assembled to the replacement spindle.

5. The method of repairing a motor vehicle axle of claim 1 wherein the spindle includes a threaded terminal portion and a seal ring secured to the replacement spindle by an interference fit having the oil seal surface.

6. The method of repairing a motor vehicle axle of claim 1 wherein disposing the mounting assembly on the vehicle axle further comprises: attaching an adjusting base having horizontal and vertical adjusting assemblies to the mounting assembly.

7. The method of repairing a motor vehicle axle of claim 1 including the step of removing a damaged portion of the motor vehicle axle.

* * * * *